United States Patent [19]

Mayr et al.

[11] Patent Number: 4,664,472
[45] Date of Patent: May 12, 1987

[54] PROTECTIVE COVERING FOR AT LEAST ONE LIGHT WAVEGUIDE

[75] Inventors: Ernst Mayr, Starnberg; Helmut Saller, Munich, both of Fed. Rep. of Germany

[73] Assignee: Siemens Aktiengesellschaft, Berlin & Munich, Fed. Rep. of Germany

[21] Appl. No.: 785,607

[22] Filed: Oct. 8, 1985

[30] Foreign Application Priority Data

Oct. 12, 1984 [DE] Fed. Rep. of Germany ....... 3437551
Apr. 4, 1985 [EP] European Pat. Off. ........... 85104165

[51] Int. Cl.⁴ ................................. G02B 5/16
[52] U.S. Cl. ................... 350/96.23; 428/376; 428/392
[58] Field of Search ............. 428/36, 412, 419, 423.1, 428/480, 424.2, 373, 375, 392, 376, 398; 350/96.23, 96.29; 65/3.11

[56] References Cited

U.S. PATENT DOCUMENTS

| | | | |
|---|---|---|---|
| 4,000,936 | 1/1977 | Gloge | 350/96.23 |
| 4,045,269 | 8/1977 | Voss et al. | 428/423.1 |
| 4,327,137 | 4/1982 | Sawa et al. | 428/412 |
| 4,364,786 | 12/1982 | Smith, Jr. et al. | 428/412 |
| 4,374,608 | 2/1983 | Anderson | 350/96.23 |
| 4,513,037 | 4/1985 | Collins | 428/480 |

FOREIGN PATENT DOCUMENTS 122786 10/1981 Fed. Rep. of Germany.
1462160 1/1977 United Kingdom.
1529001 10/1978 United Kingdom.

*Primary Examiner*—John E. Kittle
*Assistant Examiner*—James J. Seidleck
*Attorney, Agent, or Firm*—Hill, Van Santen, Steadman & Simpson

[57] ABSTRACT

A light waveguide is protected with a protective covering loosely surrounding the waveguide, which covering is constructed of an inside layer and an outside layer. The inside layer is composed of a material selected from a group consisting of polycarbonate, polyether sulfone and polyetherimide while the outside layer is composed of a material selected from a group consisting of polyester, polyether, polyurethane, copolymers of these polymers as well as block polymers of each of these polymers. The selection of these materials with the two layers provides a good connection between the two layers of the covering.

3 Claims, 1 Drawing Figure

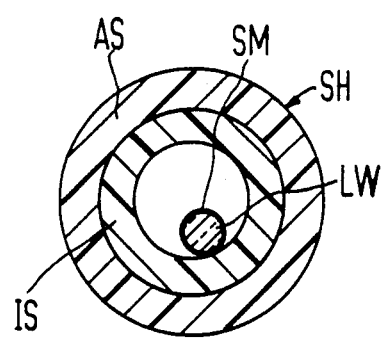

PROTECTIVE COVERING FOR AT LEAST ONE LIGHT WAVEGUIDE

BACKGROUND OF THE INVENTION

The present invention is directed to a protective covering for at least one light waveguide which covering is composed of an inside and outside layer applied thereto.

A light waveguide cable, which comprises a protective covering which is composed of an inside layer and an outside layer, is disclosed in German OS No. 2,556,861. A reinforcing material is interposed between these two layers so that a well-adhering connection between the inside layer and the outside layer cannot be produced. The inside layer of this arrangement can be composed of polyvinyl chloride, a thermoplastic elastomer or rubber, a thermoplastic polyester, polypropylene or a similar material. Polyvinyl chloride, thermoplastic elastomer or rubber and ethylene tetrafluoroethylene copolymers, copolymers of tetrafluoroethylene and hexafluoropropylene or similar materials are utilized for the outside layer.

A two-layer protective covering for a light waveguide wherein the inside layer is composed of a high-molecular polyester rubber and the outside layer is composed of a crystallizing polyester layer so that a firm adhesion between the two layers is present is disclosed in German Gebrauchsmuster No. 81 22 786. A disadvantage with this arrangement is that the polyester rubber is not economically available in the required quantities.

SUMMARY OF THE INVENTION

The present invention is directed to a protective covering for an optical waveguide which protective covering is constructed as a two-layer protective covering with a firm union between the inside layer and the outside layer despite employing relatively economical materials in forming this two-layer protective covering. This is achieved in accordance with the present invention in that the inside layer is composed of a material selected from a group consisting of polyether sulfone, polyetherimide and polycarbonate and that the outside layer is composed of a material selected from a group consisting of polyester, polyether, polyurethane, copolymers of polyester, polyether and polyurethane and block polymers of polyester, polyether and polyurethane.

The inside layer of the polyether sulfone, polyetherimide or polyester and the outside layer of the above-mentioned polymers adhere firmly to one another and are considered economical materials. Thus, these materials yield a protective covering which is both adequately longitudinally water-tight as well as air-tight.

It is expedient to employ materials having high molecular weight both for the inside layer as well as for the outside layer, particularly materials having a mol weight of at least 30,000 for the inside layer. This has the advantage that the melting stability connected therewith guarantees a reliable extrusion technique and the susceptibility of the layers to stress cracks is reduced.

Given the light waveguide structure of the invention, all wall thickness conditions which are required for light waveguide lead manufacture such as required for hybrid leads and for maxibundles, can be produced. For example, wall thicknesses between 0.1 and 2 mm per layer can be produced. One or more light waveguides can be accommodated within the double-walled covering and filled or unfilled arrangements can be utilized.

BRIEF DESCRIPTION OF THE DRAWINGS

The FIGURE is a cross-sectional view of a light waveguide with the protective covering of the present invention.

DESCRIPTION OF THE PREFERRED EMBODIMENTS

The principles of the present invention are particularly useful in a sample embodiment which is illustrated in the FIGURE. At least one light waveguide LW is situated in the inside of a protective covering SH, either loosely as illustrated or the waveguide can be received slidably to form a hybrid lead which is not shown. A protective jacket SM preferably composed of a synthetic material is applied to the light waveguide LW. The protective covering SH comprises an outside layer AS and an inside layer IS. A polycarbonate is employed for the inside layer IS whereas the outside layer is composed of a material cited hereinbelow. These materials adhere firmly to one another to polar and chemically related polymers so that no gap formations occur between the outside layer AS and the inside layer IS even given bending or tensile stresses being applied to the protective covering SH.

The manufacture of the protective covering SH expediently occurs by means of two extruders being disposed along the running direction which may be either horizontal or vertical. The first extruder produces the inside layer IS of polycarbonate at a temperature in a range of 260°–280° C. by means of profile extruding method. The calibration or control of the thickness of the inside layer IS, when making filled light waveguide leads, is effected from the inside by the outside diameter of the filling needle projecting through the extrusion tool or nozzle. The filling compound flowing through the filling needle will cool the inside layer IS below its glass temperature of about 150° C. and thus effects a solidification of the material, for example, of the polycarbonate. Given light waveguide leads, which are not provided with a filling compound, i.e., hollow leads, an additional cooling is undertaken before the outside layer is applied.

The outside layer AS is then applied to the inside layer IS which is still at a temperature of about 150° C. The second or outside layer is applied by means of a second extruder which likewise utilizes a profile extrusion method. When the two layers meet which has the diameters matching by means of drawingdown, the material of the outside layer AS must still be above its crystallite melting range which, depending on the material employed, lies in a range of 180°–280° C. A subsequent water cooling reduces the temperature of the protective covering SH to room temperature.

While polycarbonate was mentioned as the material for the inside layer IS in the above description, other materials can be employed for the material of the inside layers as a preferred material. These are polyether sulfone, an example of which is sold under the trade name "Ultrason E 6000" by BASF AG of Ludwigshafen, Federal Republic of Germany. Another material that can be used for the inside layer is polyetherimide, an example of which is sold by General Electric Company, Pittsfield, USA under the trade name "Ultem 1000". An example of the polycarbonate that can be used for the inside layer is a polycaronbate sold by Bayer AG of Leverkusen, Federal Republic of Germany under the trade name "Makrolon 3118".

Examples of materials which can be utilized for the outside layer AS are polyester block polymers and polyether block polymers and examples of these materials are sold by E. I. du Pont de Nemours & Company of Wilmington, Del. under the trade name "Hytrel 6346" and "Hydrel 7246". Another example of a material for the outside layer AS is a polyether such as sold by Chemische Werke Hüls AG, Marl, Federal Republic of Germany under the trade name "Vestodur B 3000". Yet another example of a material for the outside layer is a polyurethane which is sold by B. F. Goodrich Chemical Company, Cleveland, Ohio under the trade name "Estane 58202".

Although various minor modifications may be suggested by those versed in the art, it should be understood that we wish to embody within the scope of the patent granted hereon, all such modifications as reasonably and properly come within the scope of our contribution to the art.

We claim:

1. In a light waveguide cable with a protective covering and at least one light waveguide being disposed in the covering with spacing therebetween, said covering being composed of an inside layer and an outside layer applied on said inside layer, the improvements comprising the inside layer being composed of a material selected from a group consisting of polyether sulfone, polyetherimide and polycarbonate and the outside layer being composed of a material selected from a group consisting of polyester, polyether, polyurethane, copolymer of polyester, copolymer of polyether, copolymer of polyurethane, block polymer of polyester, block polymer of polyether and block polymer of polyurethane.

2. In a light waveguide cable according to claim 1, wherein protective covering has a wall thickness falling in the range of 0.1 to 2 mm per layer.

3. In a light waveguide cable according to claim 1, wherein the materials for both the inside layer and the outside layer have a high molecular weight with the material selected for the inside layer having a mol weight of at least 30,000.

* * * * *